US012415368B2

(12) United States Patent
Kopfer

(10) Patent No.: US 12,415,368 B2
(45) Date of Patent: Sep. 16, 2025

(54) APPARATUS AND METHOD FOR DIRECT PRINTING ON CORRUGATED METAL CLAD CABLE

(71) Applicant: Cerro Wire LLC, Hartselle, AL (US)

(72) Inventor: Jon Kopfer, Huntsville, AL (US)

(73) Assignee: Cerro Wire LLC, Hartselle, AL (US)

( * ) Notice: Subject to any disclaimer, the term of this patent is extended or adjusted under 35 U.S.C. 154(b) by 0 days.

(21) Appl. No.: 18/158,009

(22) Filed: Jan. 23, 2023

(65) Prior Publication Data

US 2024/0157709 A1 May 16, 2024

Related U.S. Application Data

(60) Provisional application No. 63/319,518, filed on Mar. 14, 2022, provisional application No. 63/302,312, filed on Jan. 24, 2022.

(51) Int. Cl.

| | |
|---|---|
| ***B41J 3/413*** | (2006.01) |
| ***B41J 11/00*** | (2006.01) |
| ***B41J 13/02*** | (2006.01) |

(52) U.S. Cl.
CPC ......... *B41J 3/413* (2013.01); *B41J 11/00214* (2021.01); *B41J 13/02* (2013.01)

(58) Field of Classification Search
CPC ....... B41J 3/413; B41J 11/00214; B41J 13/02
See application file for complete search history.

(56) References Cited

U.S. PATENT DOCUMENTS 10,493,777 B1 * 12/2019 McConville ....... B41J 11/00216
2010/0101716 A1 * 4/2010 Roof .................. B41J 11/00214 156/247

* cited by examiner

*Primary Examiner* — Anh T Vo
(74) *Attorney, Agent, or Firm* — Arnold & Porter Kaye Scholer LLP

(57) ABSTRACT

An apparatus and method for direct printing on corrugated metal clad cable. The apparatus includes an entrance having one or more entrance rollers, a set of lower rollers, a series of printheads near the entrance, a UV curing station downstream of the printheads, one or more exit rollers, a print controller and a series of ink tanks. The entrance and exit rollers maintain the cable in proper position and alignment for the printheads. The method for printing provides for clear and legible printing on the cable.

11 Claims, 16 Drawing Sheets

APPARATUS AND METHOD FOR DIRECT PRINTING ON CORRUGATED METAL CLAD CABLE

CROSS-REFERENCE TO RELATED APPLICATION DATA

This application claims the benefit of and priority to Provisional U.S. Patent application Ser. No. 63/302,312, filed Jan. 24, 2022, titled, APPARATUS AND METHOD FOR DIRECT PRINTING ON CORRUGATED METAL CLAD CABLE, and Provisional U.S. Patent application Ser. No. 63/319,518, filed Mar. 14, 2022, titled, APPARATUS AND METHOD FOR DIRECT PRINTING ON CORRUGATED METAL CLAD CABLE, the disclosures of which are incorporated herein in their entireties.

BACKGROUND

The present disclosure relates generally to an apparatus and method for printing on metal clad cable, and more particularly, to an apparatus and method and for direct fixed and variable printing on corrugated metal clad cable.

Metal clad cable has a spiral wound, interlocked or corrugated metal cladding or armor that may provide a low impedance ground path or grounding conductor for equipment. The cladding or armor is spiral wound with edges interlocking adjacent edges that also provides continuous protection for the wires within the cladding. Typical metal clad (MC) cables can include power conductors, an insulated grounding conductor, bare grounding/bonding wire(s), signal or control conductors and the like.

It is often necessary to provide marking on the cable to indicate the type(s) of conductors, conductor sizes, whether the cable includes a tape or tapes, and a length markings along the cable. Markings may also be required to meet certain industry codes or standards.

There are various known ways in which markings are provided on cables. For example, some cables include tapes affixed to the surface of the cable armor. Other ways in which cables are marked include application of paint or printing directly on the cable armor, etching or embossing the armor.

There are, however, drawbacks to these known systems. For example, physical tapes affixed to the armor can inadvertently fall off of the armor. This is particularly the case when the cables are manipulated, as when they are pulled though conduit or wall openings. In addition, the physical tapes can require an adhesive or an additional adhesive tape to secure the tape to the cable armor.

Painting on the cable armor, while it may provide permanent marking, may not dry properly during the cable fabrication process and as such the paint may smudge or smear, making the marking unreadable or unreliable. Etching and embossing require specialized equipment which can add costs and time, as well as equipment maintenance.

Accordingly, it is desirable to provide a method and apparatus for printing on metal clad cable. Desirably, such a method and apparatus provide printing that meets required industry codes and standards. More desirably still, such a method and apparatus provide for printing direct fixed and variable markings on metal clad cable, which markings are clear and do not smudge or smear upon manufacture or use.

SUMMARY

According to one aspect an apparatus for direct printing on corrugated metal clad cable includes an entrance having one or more entrance rollers, a set of lower rollers, a series of printheads near the entrance, a UV curing station downstream of a last of the series of printheads, one or more exit rollers, a print controller and a series of ink tanks.

The apparatus provides clear and legible printing on the cable. The printing can include indicia or markings, such as a distance or length marking, a color code indicating the clad material, markings that indicate the number and color of the conductors and the direction of pull of the cable, indicators showing the conductor gauge and number of conductors, and the like.

In embodiments of the apparatus, the lower rollers can be V-groove rollers and can include a low friction surface. The apparatus can include a gap between the last printhead of the series of printheads and the UV curing station.

The entrance rollers can be V-groove rollers. The entrance and/or exit rollers can be biased downwardly toward the cable. The rollers can be mounted to arms that are biased, as by springs toward the cable.

The apparatus can include multiple print controllers.

In another aspect, a method for direct printing on corrugated metal clad cable includes providing a printing system having one or more entrance rollers, a series of lower rollers, a series of printheads, a UV curing station, one or more exit rollers and one or more print controllers. The method includes transporting the cable into the printing system, passing the cable through the entrance rollers and along the lower rollers, moving the cable past the printheads, and printing one or more markings on the cable, moving the cable through a space between a last of the series of printheads and the UV curing station, moving the cable though the UV curing station to cure the one or more markings on the cable and passing the cable through the exit rollers.

In methods, the entrance, exit and/or lower rollers can be V-groove rollers. The entrance and exit rollers can be biased downwardly toward the cable. The entrance and exit rollers can be mounted to arms and the arms can be biased, as by springs, toward the cable. The method can include biasing the cable toward the lower rollers. Other types of rollers can be used to maintain the cable properly distanced from and aligned with the printheads.

In methods, the markings can include one or more of a distance or length marking, a clad material marking, a conductor number and color marking, a direction of pull of the cable marking, and a conductor gauge and material marking. The clad material marking and/or the conductor number and color marking can be color coded markings. The number and color of the conductors marking and the direction of pull of the cable marking can be the same marking. The conductor gauge and material marking can be the same marking. The number and color of the conductors marking and the direction of pull of the cable marking can be, for example, chevrons.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
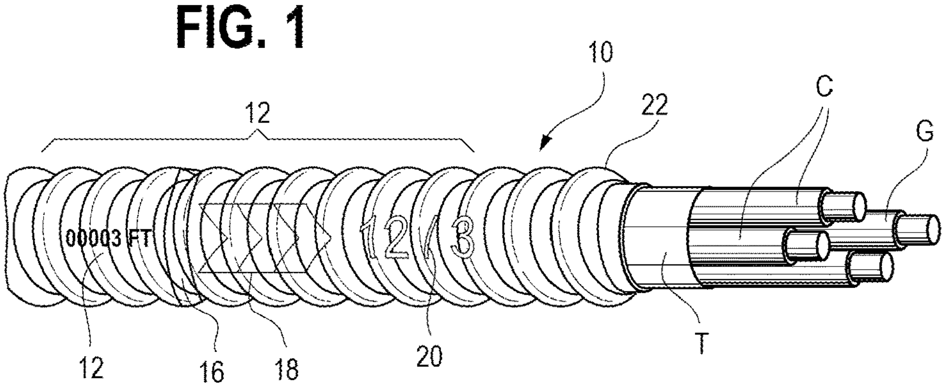
FIG. 1 is an illustration of an example of a metal clad cable having printing thereon according to an embodiment described herein.

Referring to the figures, and in particular to FIG. 1, there is shown an example of a metal clad or armored corrugated cable 10 having markings or indicia 12 thereon. The markings 12 can include, for example, a distance or length marking 14, a color code 16 indicating the clad material, which in the illustrated embodiment is a blue marking indicating a steel clad, a series of markings, which can be, for example as illustrated, in the form of chevrons 18, that indicate the number and color of the conductors C and the direction of pull of the cable 10, and numeric indicators 20 showing the conductor C gauge and number of conductors C. The color of the numeric indictors 20 indicates the armor material.

All of the markings 12 are made directly on the metal clad 22 using an ultraviolet (UV) curable ink formulation. The distance or length marking 14 is variable with the length of the cable 10 in a particular or given run of cable 10. That is the distance or length marking 14 will change along the length of the cable 10 being marked. It is anticipated that only one particular type of cable 10 will be fabricated at a time. As such, while the distance or length marking 14 is variable, it is anticipated that the other markings, including, for example, the color 16 code indicating the clad material and a measuring (distance or length) mark, the series of markings (the illustrated chevrons 18), that indicate the number and color of the conductors C and the direction of pull of the cable 10, and the numeric indicators 20 showing the conductor C gauge and number of conductors C may all be fixed markings or indicia for a given cable 10 fabrication run.

Figure 2:
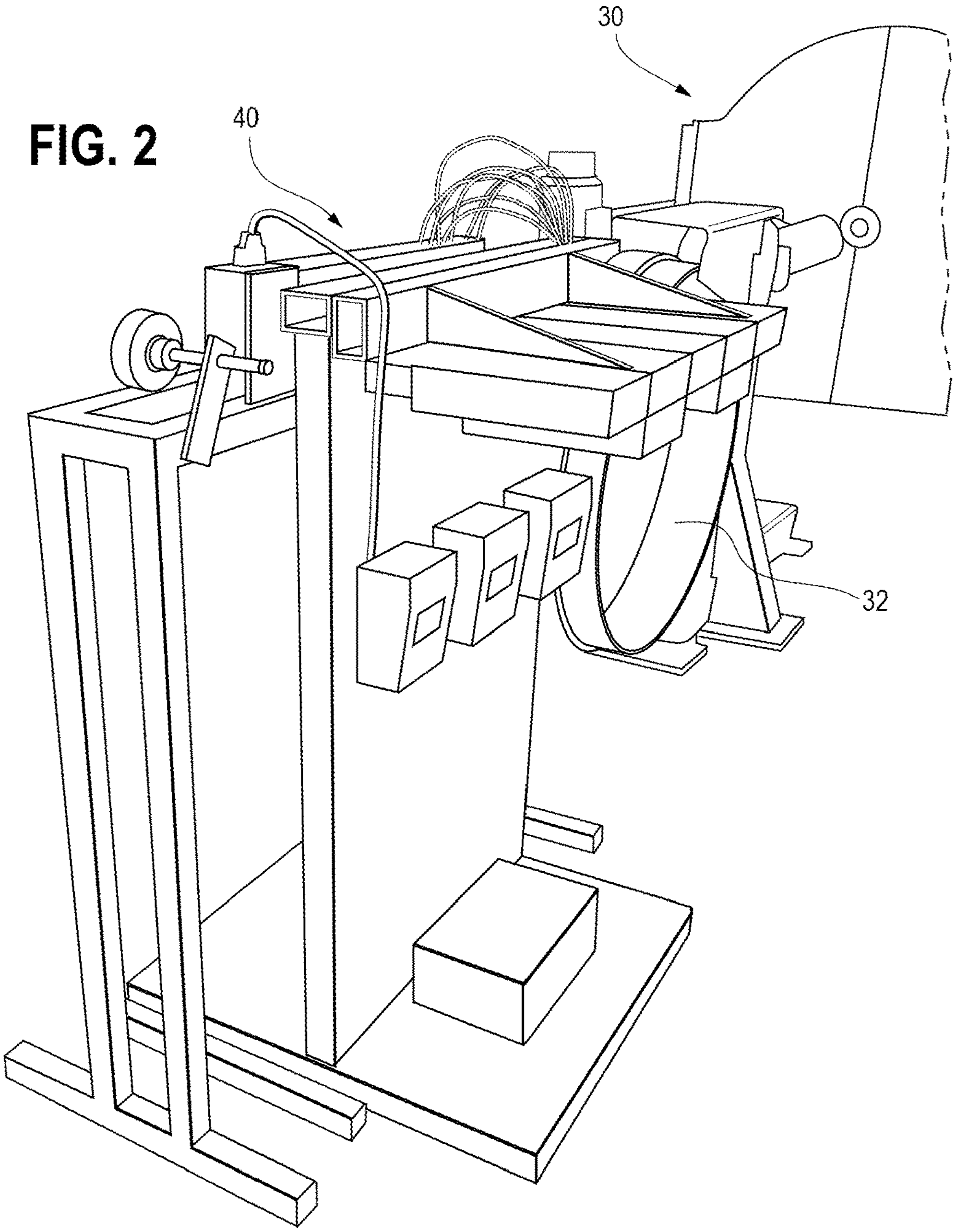
FIG. 2 is a rear view of a system for printing on metal clad cable as viewed looking upstream of the system.
Figure 3:
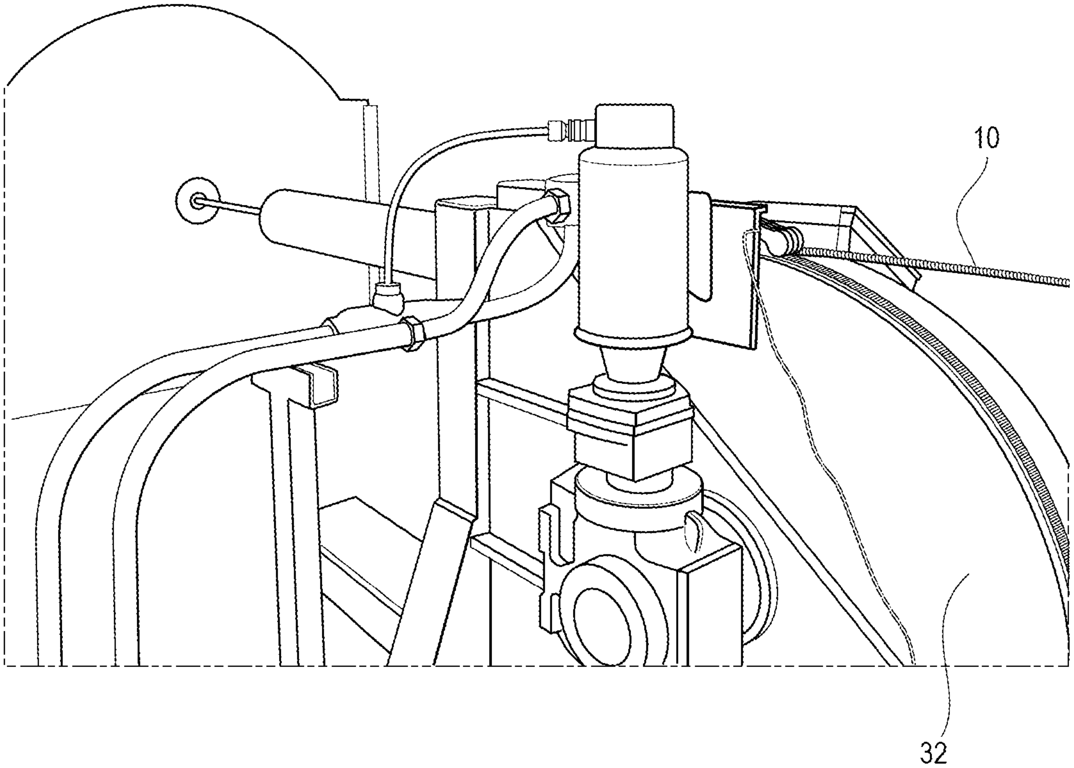
FIG. 3 is a perspective illustration an example of an apparatus for fabricating metal clad cable.

FIGS. 2 and 3 illustrate a portion of the cable fabrication 30 and printing 40 systems. The fabrication system 30 is well known in the art. Briefly, conductors C are drawn into the fabrication system 30 in which the clad or armor 22 is wound around the conductors C and as desired, tape T, bare grounding/bonding wire(s) G, signal or control conductors and the like, as desired for the particular cable 10 configuration.

Figure 4:
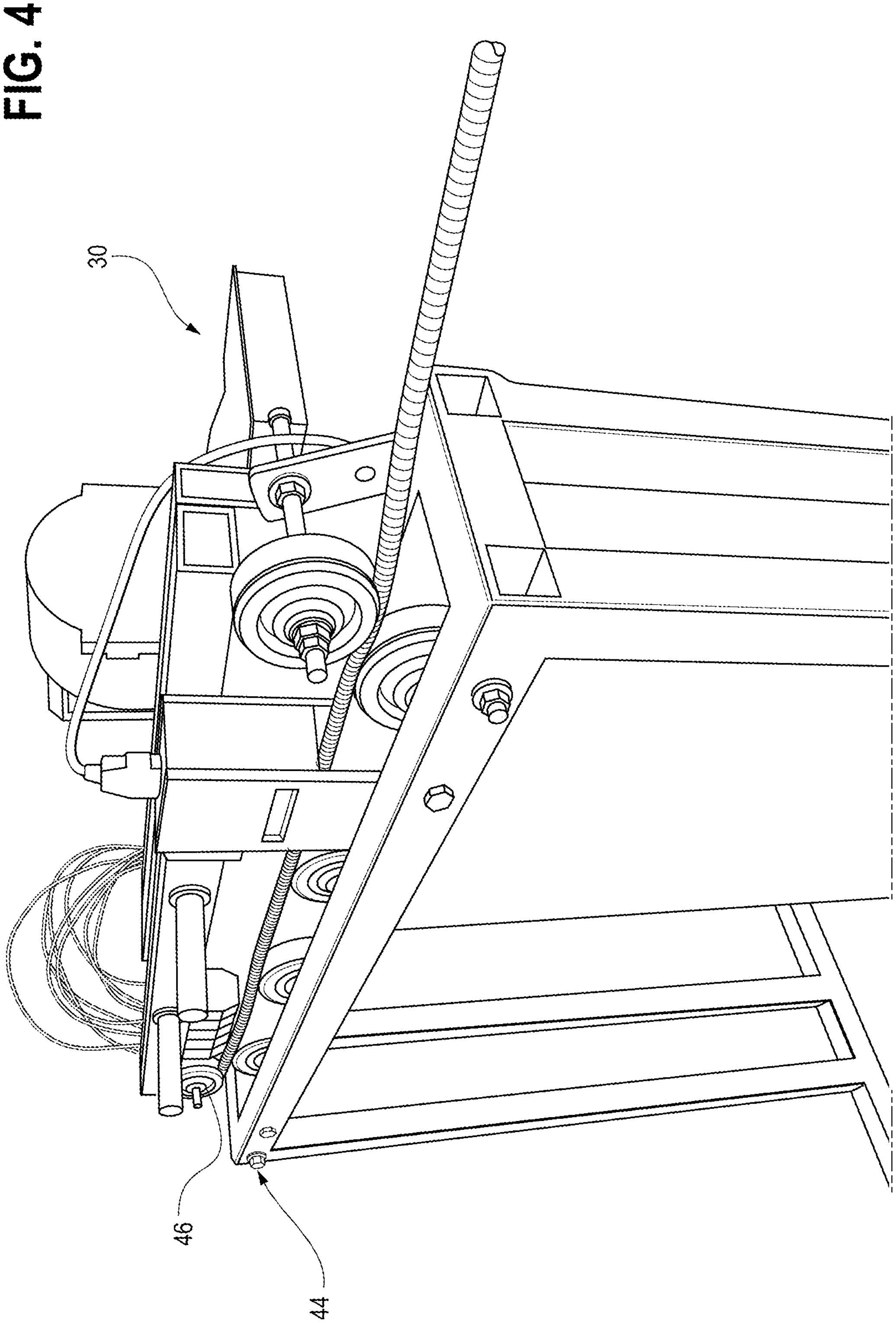
FIG. 4 is a front view of the printing system as viewed looking upstream of the system.
Figure 5:
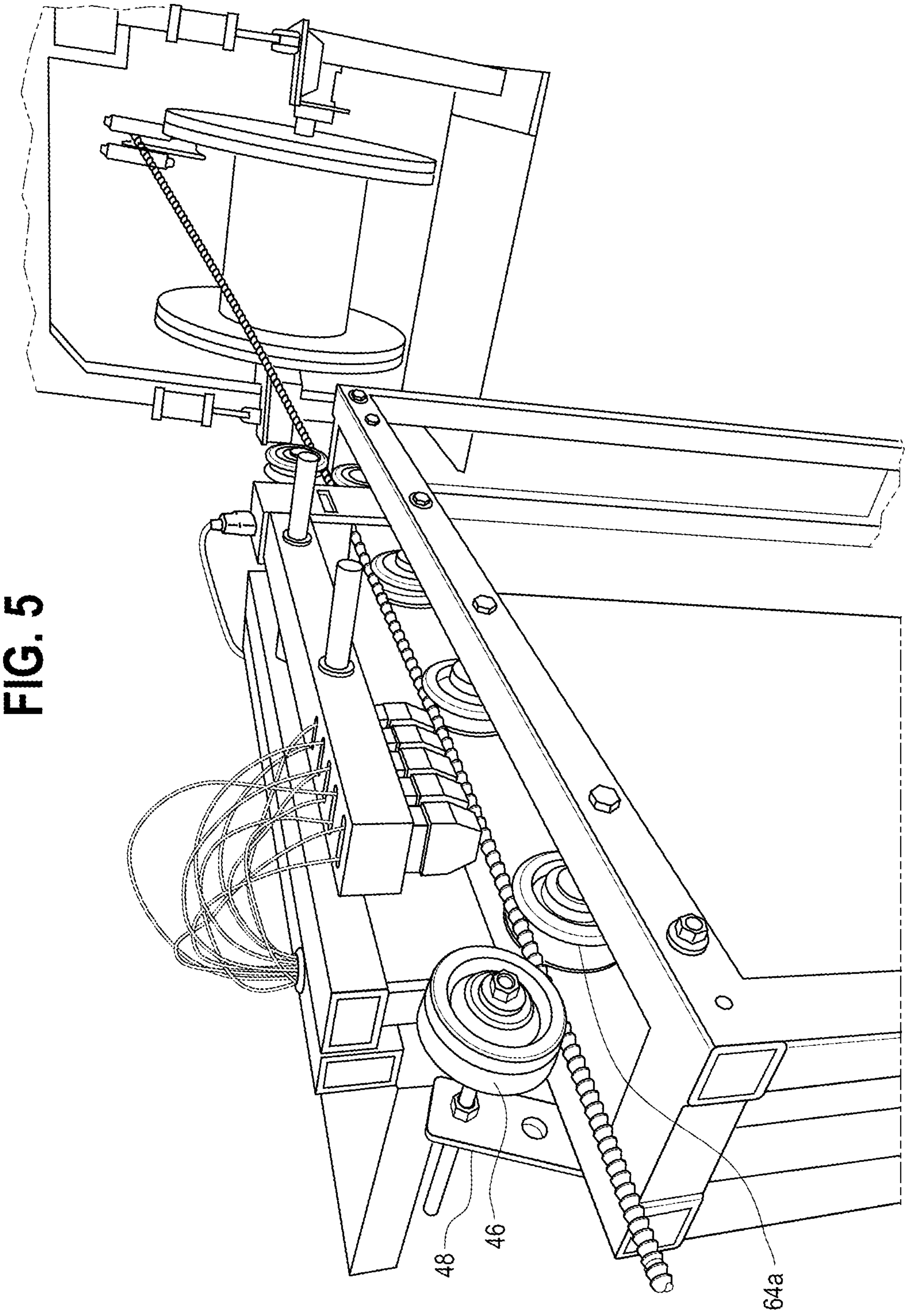
FIG. 5 is a perspective view of the rear of the printing system as viewed looking downstream of the system.
Figure 6:
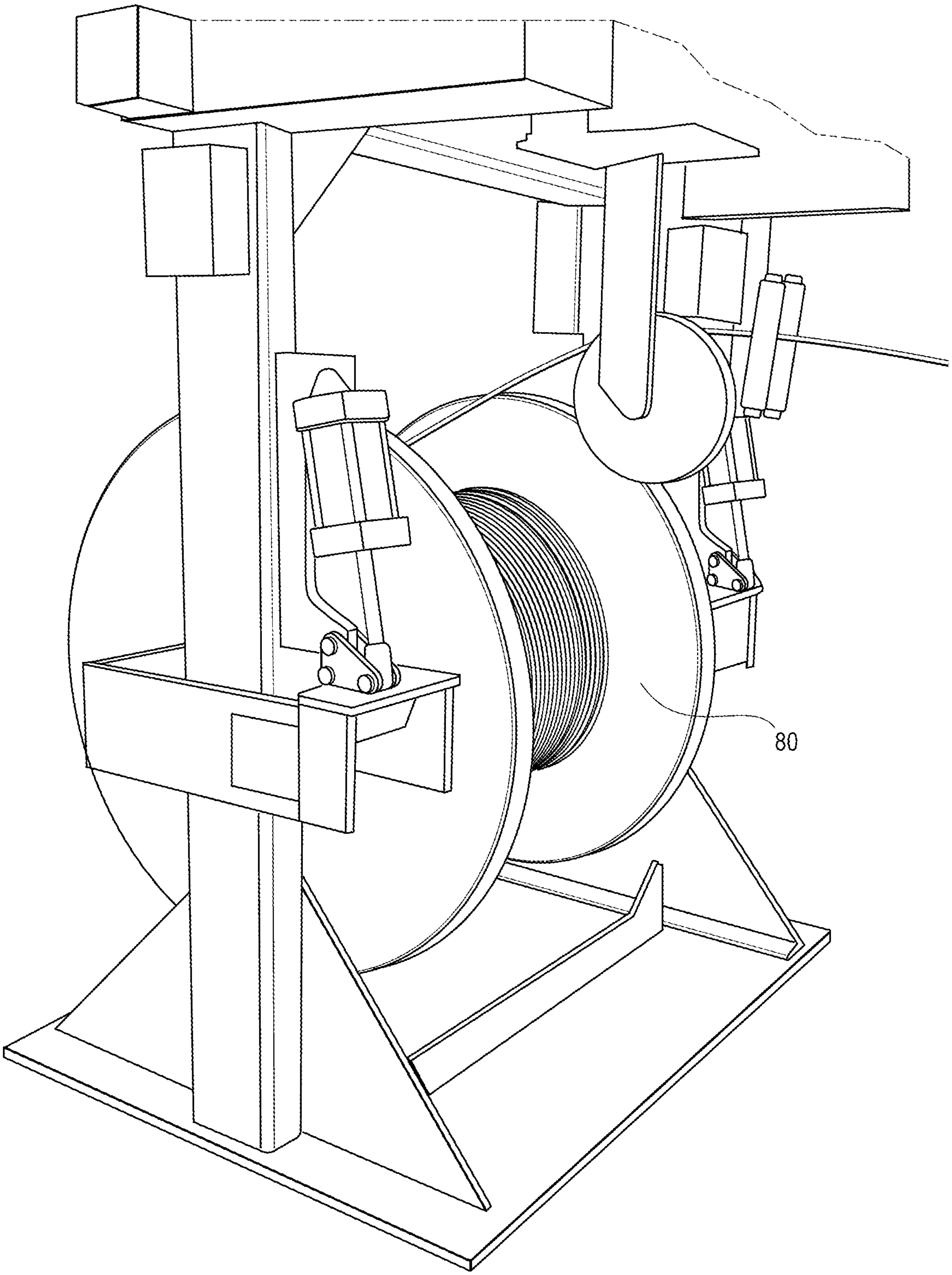
FIG. 6 is a view of the cable take-up portion of the cable fabrication system.
Figure 7:
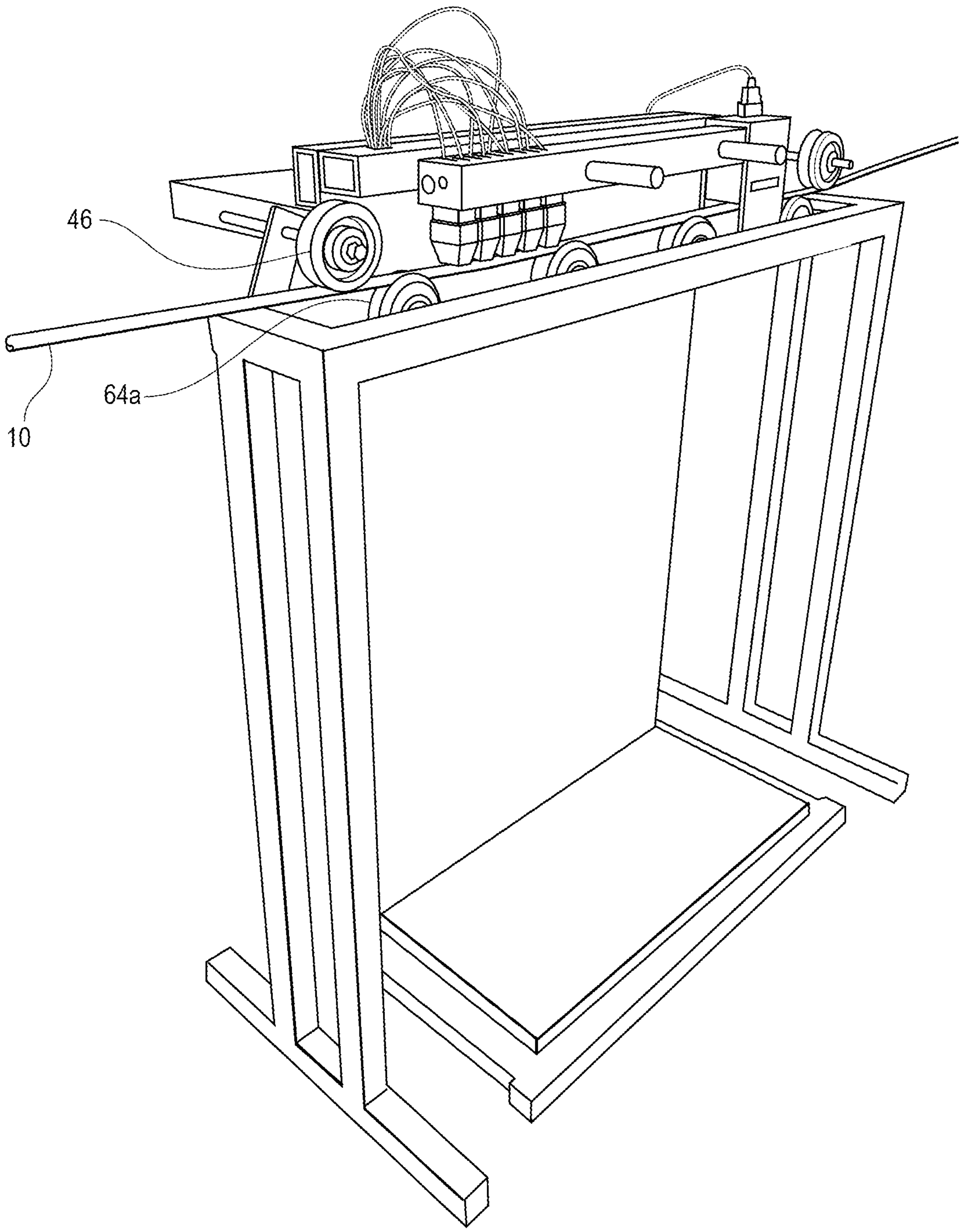
FIG. 7 is another front view of the printing system as viewed looking downstream of the system.
Figure 8:
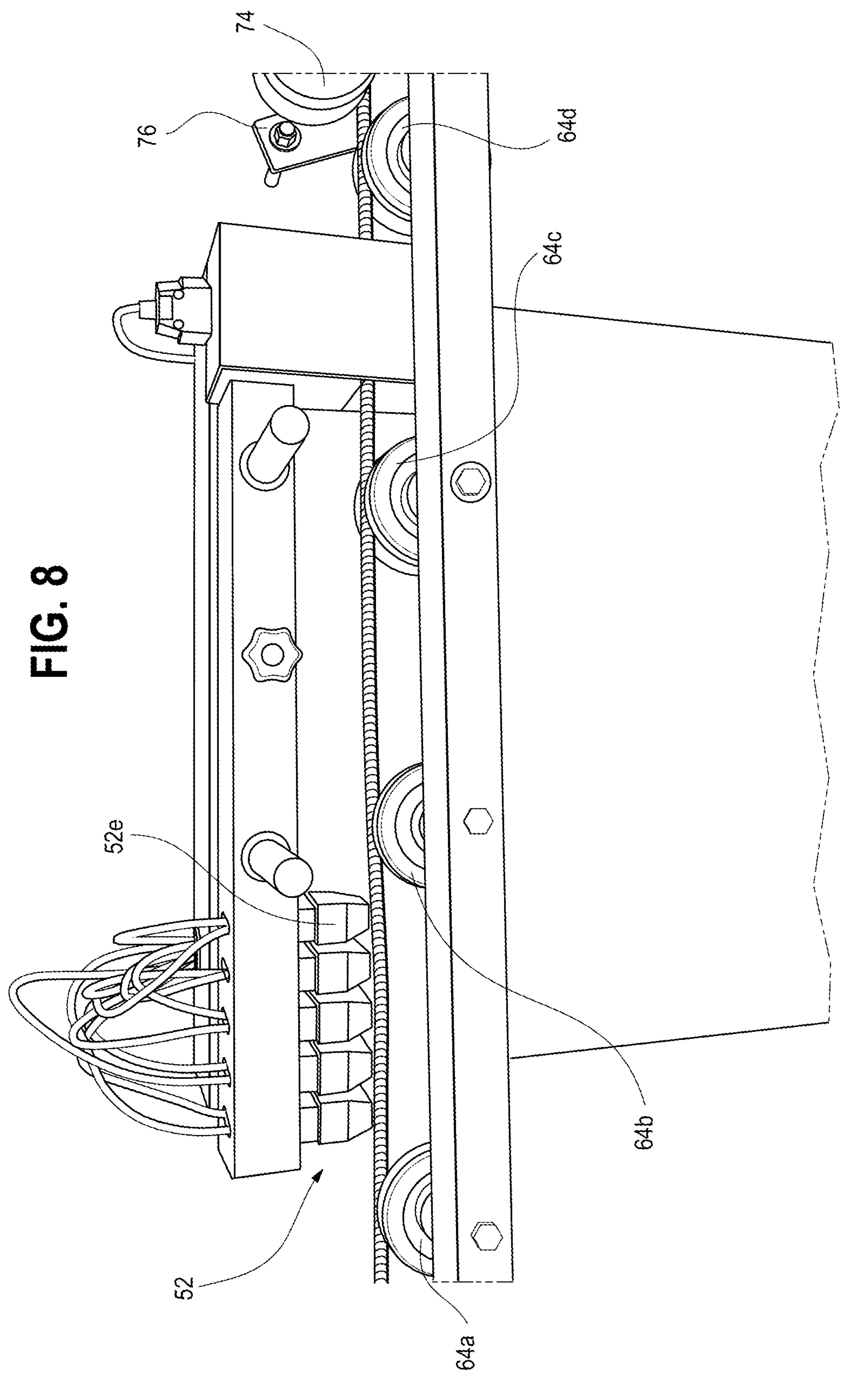
FIG. 8 is a front view of the printing system.
Figure 9:
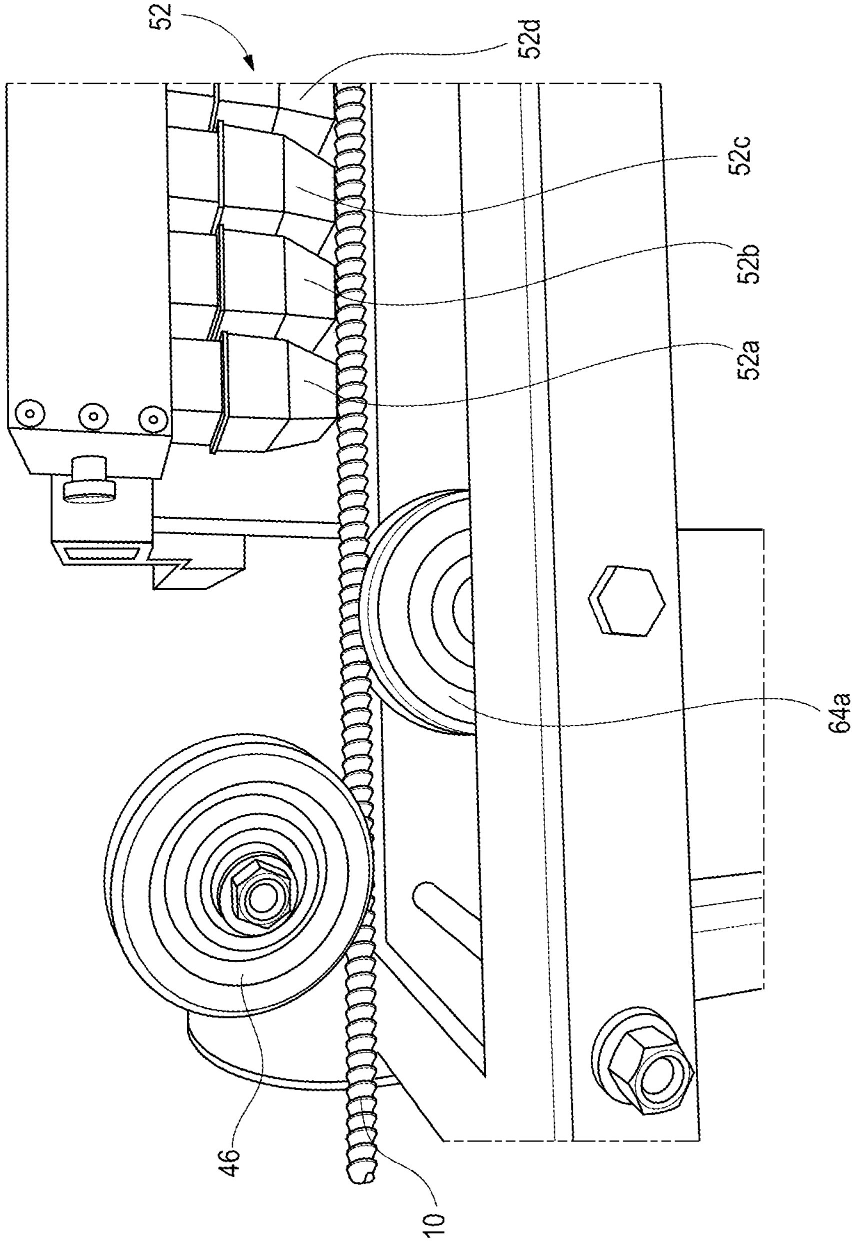
FIG. 9 is a front view of the printing system illustrating an embodiment of an entrance roller and a lower roller.
Figure 10:
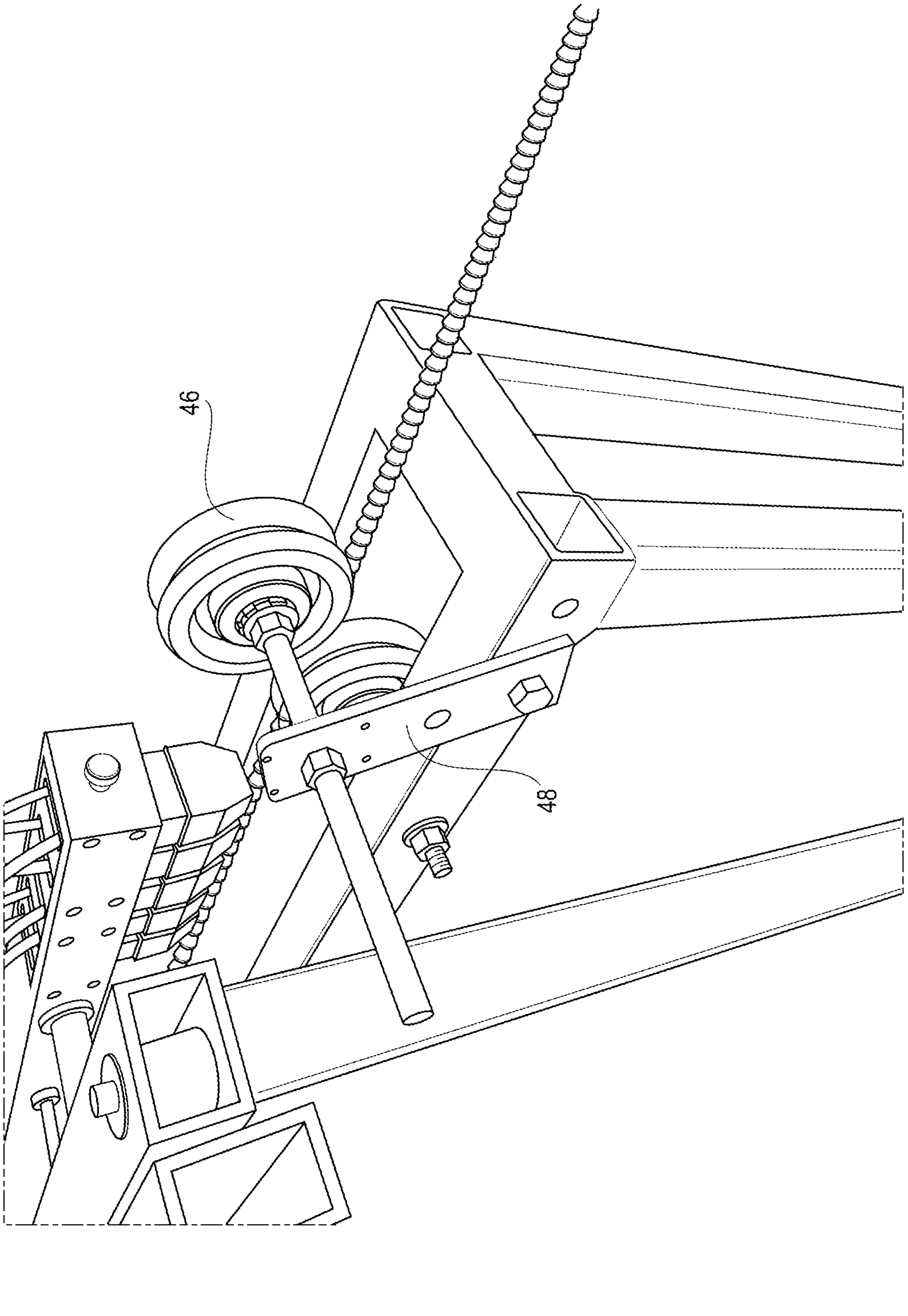
FIG. 10 is perspective rear view of the entrance roller of FIG. 9.
Figure 11:
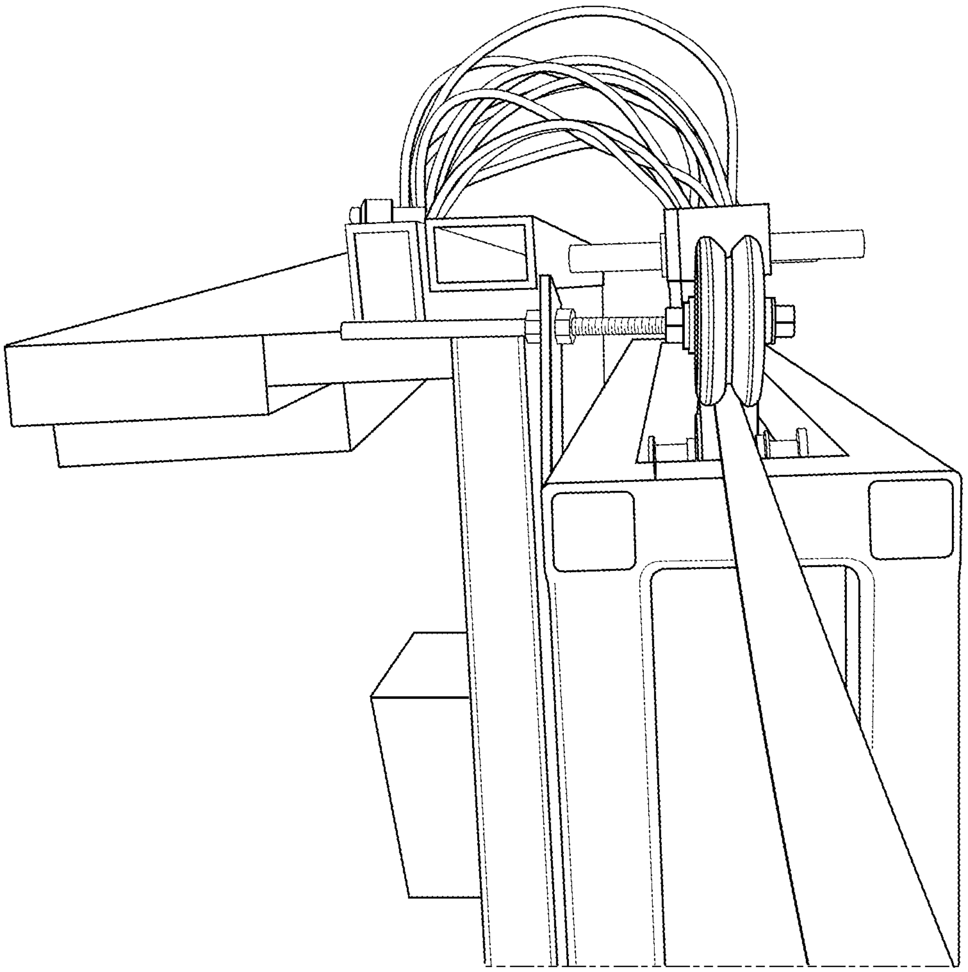
FIG. 11 is view along the cable looking downstream into the printing system.
Figure 12:
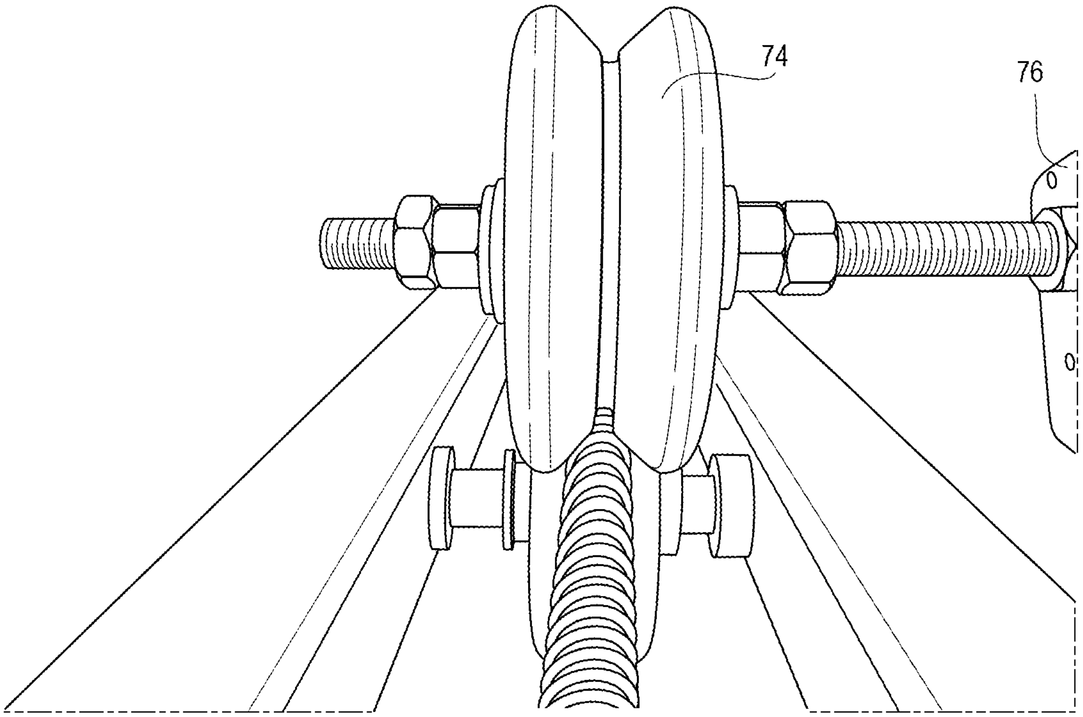
FIG. 12 is view along the top side of the cable looking upstream into the printing system.
Figure 13:
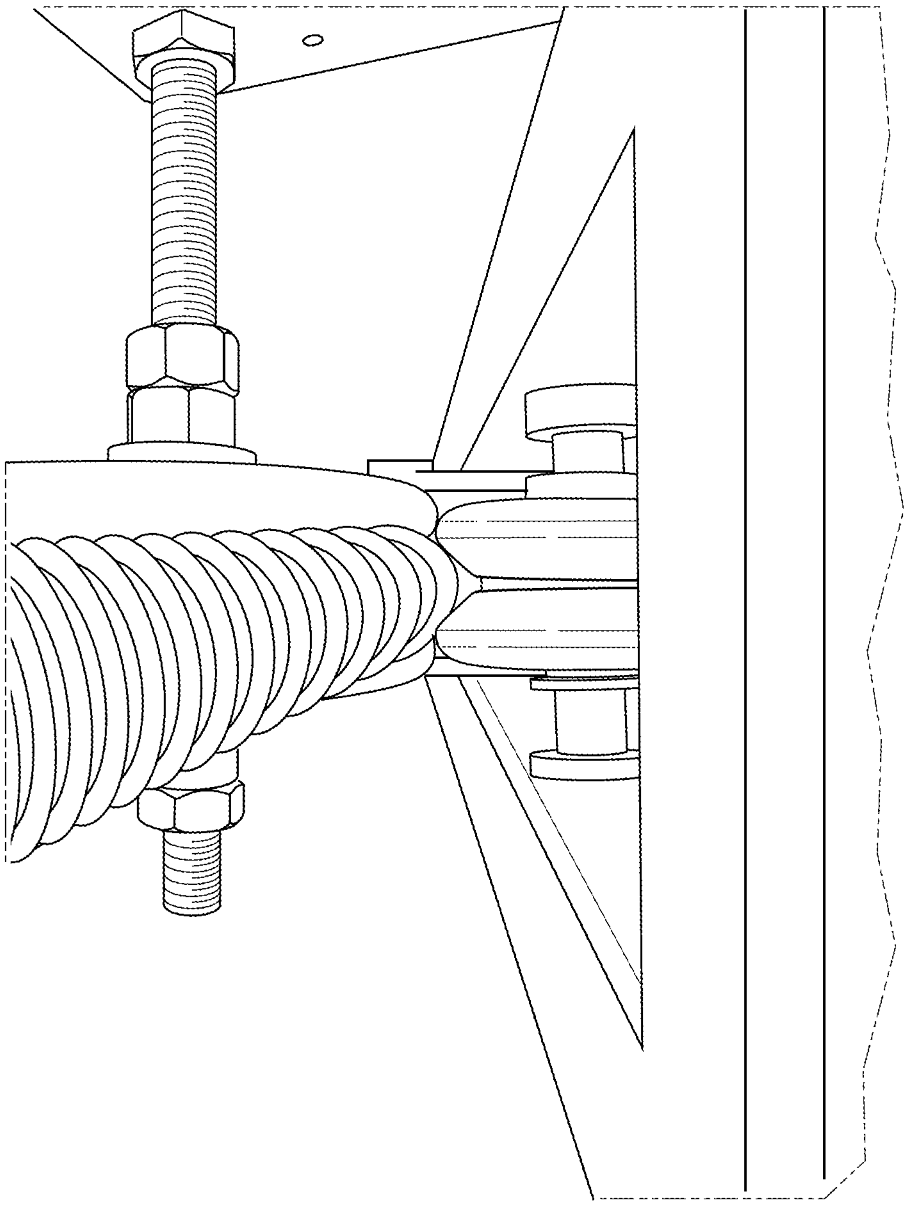
FIG. 13 is view along the bottom side of the cable looking upstream into the printing system.
Figure 14:
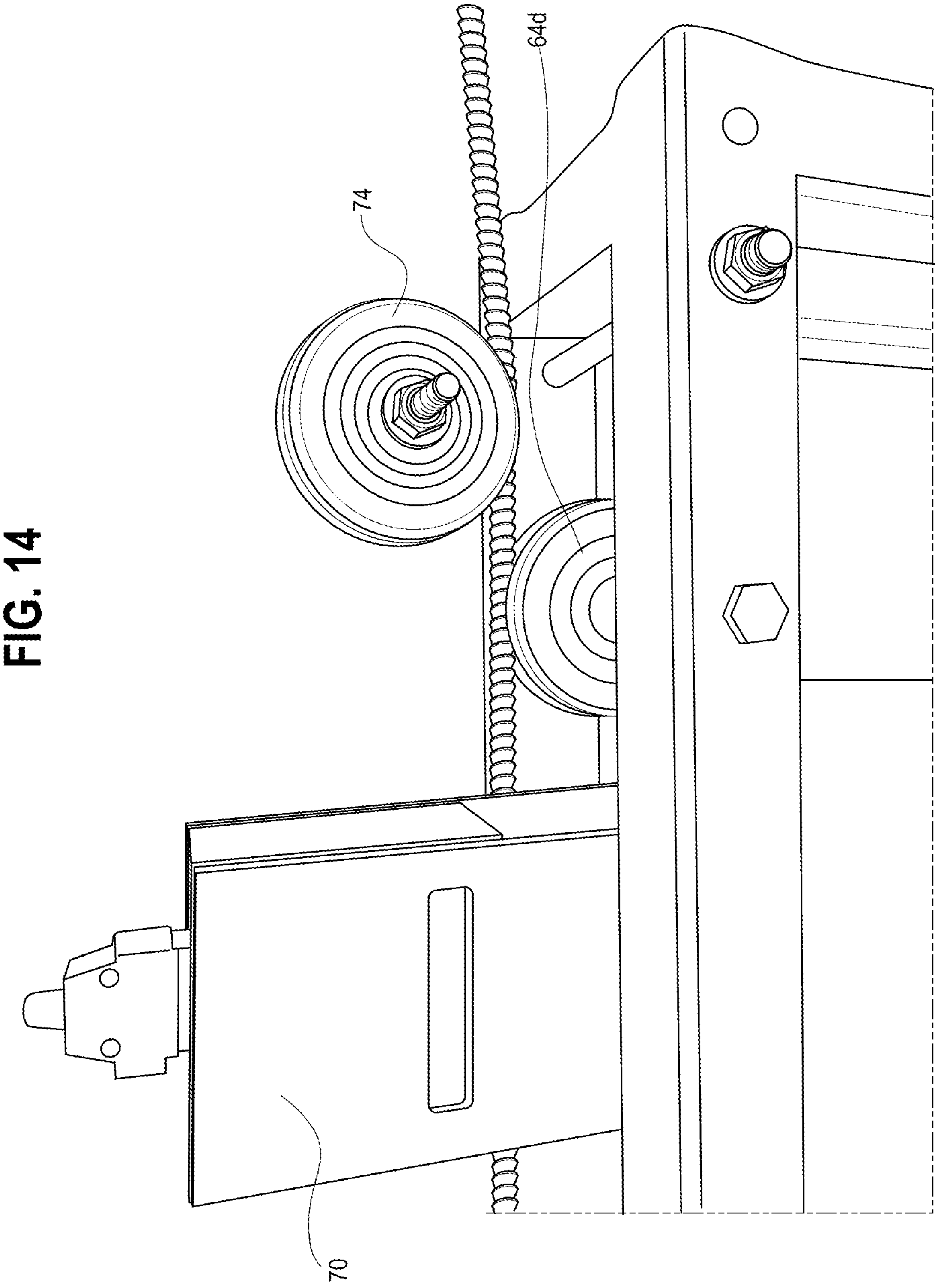
FIG. 14 is a front view of the printing system illustrating an embodiment of an exit roller and a lower roller.
Figure 15:
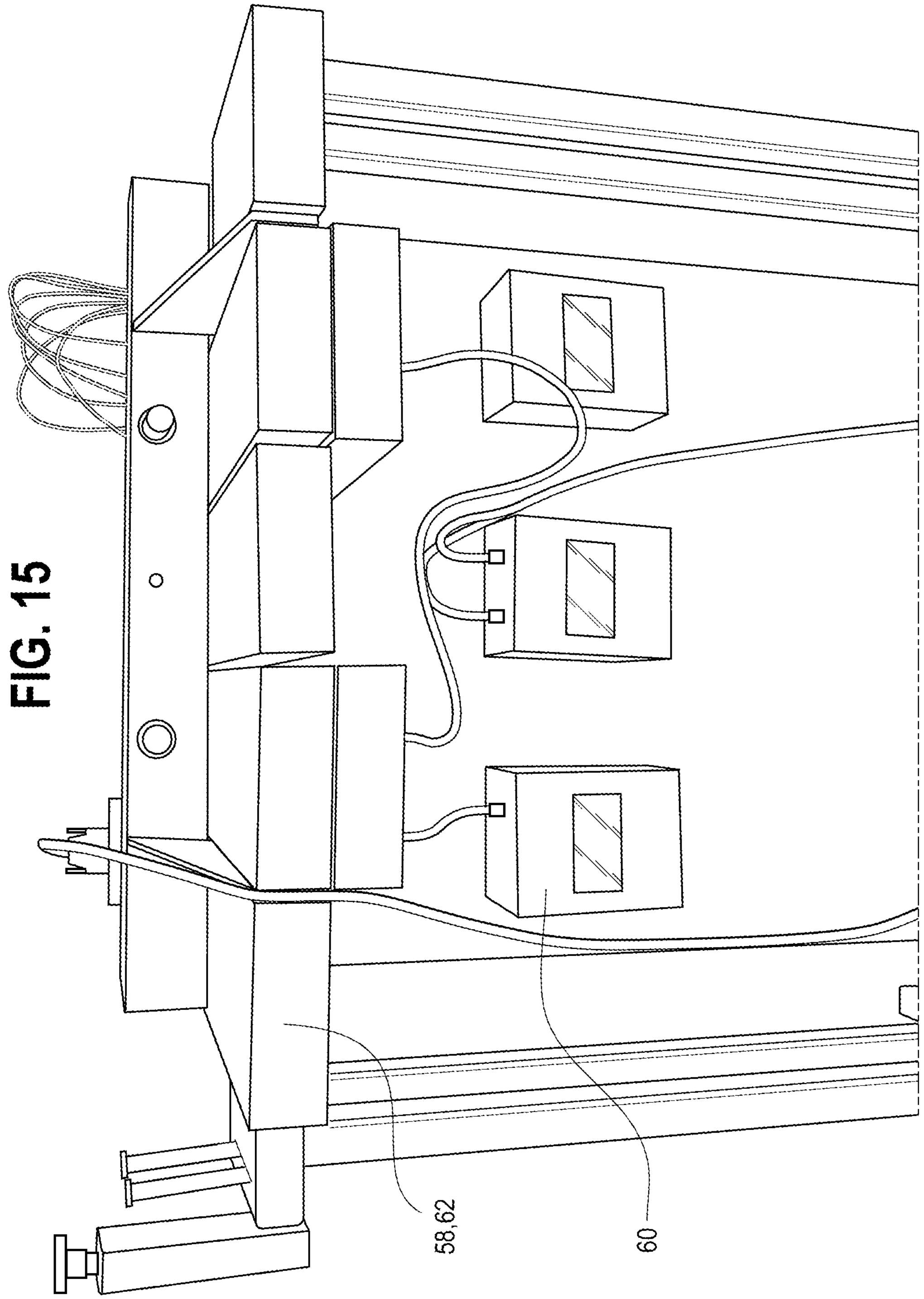
FIG. 15 is a rear view of the printing system.
Figure 16:
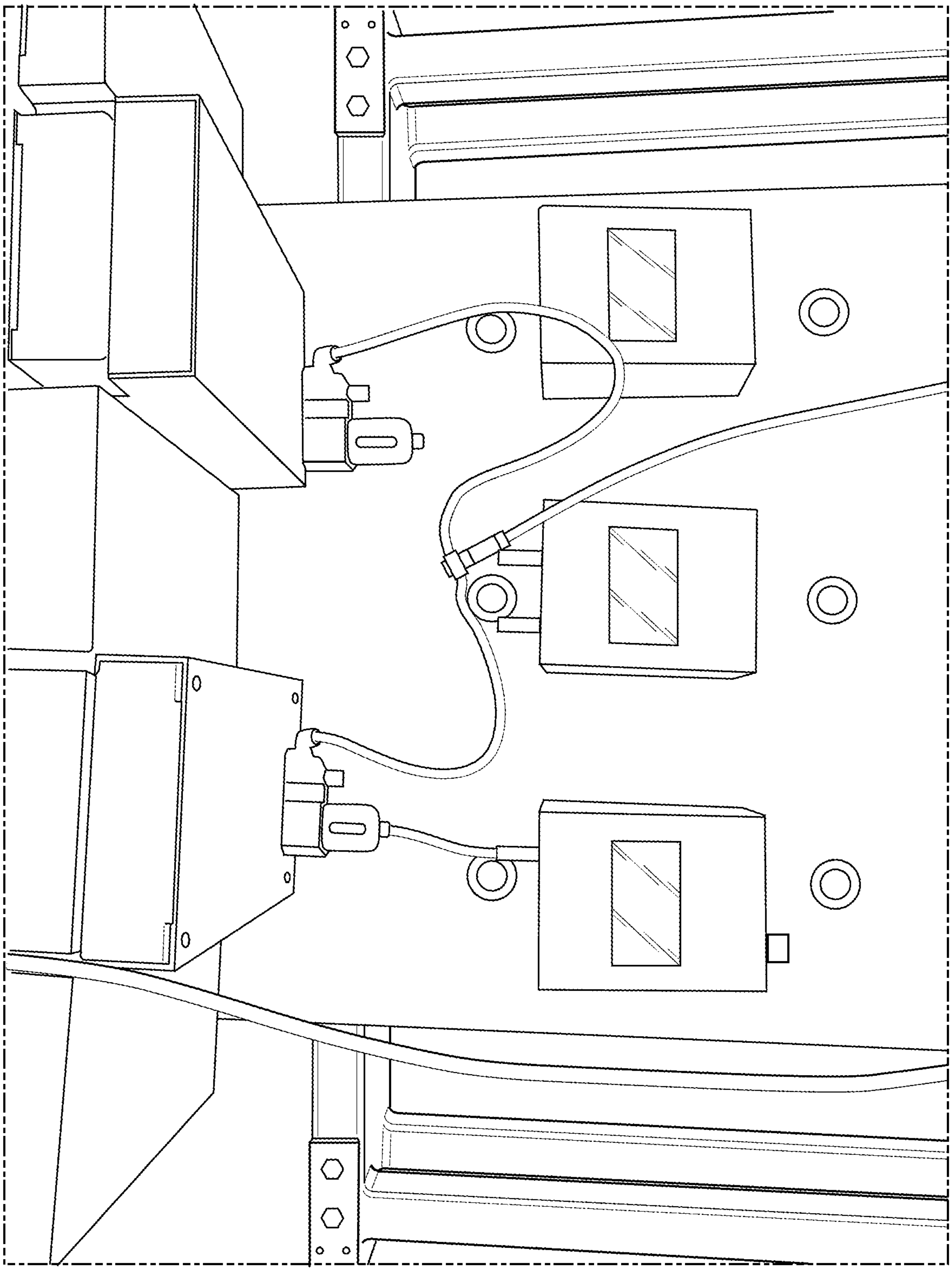
FIG. 16 is an enlarged lower rear view of the printing system.

As the cable 10 exits the cable fabrication system 30, it is wound around a drum 32 to maintain a desired tension and fabrication rate. As seen in FIGS. 4 and 5, in the illustrated process, the now formed cable 10 enters the printing system 40. The entrance 44 of the printing system 40 includes one or more entrance rollers 46 to maintain the cable 10 in proper horizontal placement, e.g., a horizontal plane centered, in the printing system 40. The entrance roller 46 can be mounted to bias the cable 10 downwardly. In a current embodiment, the entrance roller 46 is mounted to an arm 48 and the arm 48 is biased, as by a spring (not shown) downwardly. The downward bias of the entrance roller 46, in conjunction with a first lower roller 64*a* maintains the cable 10 in proper vertical placement, e.g., vertical plane, to maintain the cable 10 a proper distance from the printheads 52. In a current embodiment, the entrance and first lower roller 46, 64*a* (as well as the remaining lower rollers 64) can be V-groove rollers to provide both centering and hold-down functions.

Following the entrance roller 46, the system 40 includes a series of printheads 52 (see FIGS. 7-10) near the entrance 44 to the printing system 40. The printheads 52 each print a specific, individual color of ink onto the cable 10 as the cable 10 moves past the printhead 52. In a current embodiment, the colors include a blue ink, a black ink, a white ink, a red ink and a green ink. It will be appreciated that any ink colors can be used in the system 40 and method.

The printing system 40 further includes a series of ink tanks 58 corresponding to the ink colors used and a series of controllers 60 and pumps 62 for controlling the application of the inks. The system 40 may be configured such a controller 60 controls the application of multiple inks.

The system 40 also includes a series of lower rollers 64 (as briefly discussed above), along which the cable 10 moves during the printing process. The lower rollers 64 may have a low friction surface 66, such as a Teflon surface. The lower rollers 64 can, like the entrance roller 46, be V-groove rollers to maintain horizontal alignment of the cable 10 and, with the entrance roller 46, maintain proper vertical alignment of the cable 10 relative to the printheads 52 during the printing process. In a current embodiment, the lower rollers 64 are idler rollers and do not provide a drive force for the cable. One or more of the lower rollers 64 may also be a driven roller.

A UV curing station 70 is located downstream of the printheads 52. In order to provide a measure of natural curing, the UV station 70 is located a distance downstream of the printheads 52; that is, there is a gap 72 between the last pinhead 52*e* and the UV station 70. A final lower roller 64*d* is located downstream of the curing station 70. In a current embodiment the printing system 40 includes one or more exit rollers 74 downstream of the final lower roller 64*d*.

The exit roller 74 can, like the entrance roller 46 and lower rollers 64, be a V-groove roller. The exit roller 74 maintains the cable 10 in proper horizontal placement, e.g., centered, in the printing system 40 relative to the printheads 52, and along with the final lower roller 64*d*, maintains the cable 10 in proper vertical placement, e.g., maintains the cable 10 a proper distance from the printheads 52. The exit roller 74 can, like the entrance roller 46, be mounted to an arm 76 and the arm 76 can be biased, as by a spring (not shown), to maintain the cable 10 in proper vertical placement, e.g., vertical plane, to maintain the cable 10 a proper distance from the printheads 52. The V-groove roller 74 provides both centering and hold-down functions.

As illustrated, the entrance and exit rollers 46, 74 and the lower rollers 64 help to maintain the cable in proper horizontal and vertical planes to maintain the cable 10 properly distanced and aligned with the printheads 52. It has also been found that excessive vibration can be induced in the cable 10 and that the entrance and exit rollers 46, 74 dampen the vibration to facilitate maintaining the cable the still (e.g., reduce vibration) as well as properly distanced relative to, and aligned with, the printheads 52 to facilitate clear and legible printing on the cable 10.

It has also been found that providing a gap 72 between the last printhead 52*e* and the UV curing station 70 also helps setting of the ink prior to UV curing, so that when the cable 10 exits the printing system 40 the ink is fully cured and does not smear or smudge when it is subsequently stored on a spool 80. It has also been found that because the cable 10, as it is wound onto the spool 80, is moved laterally across the spool 80, the rollers maintain the cable 10 in a proper horizontal position relative to the printheads 52.

The printing system 40 is a modular system. As such, the entrance and exit rollers 46, 74, lower rollers 64, printheads 52, ink tanks 58, controllers 60 and pumps 62 can be readily removed and replaced with minimal impact on the overall cable fabrication system and production timing.

It is anticipated that the printing system 40 can be separate and apart from the cable fabrication system 30. That is, the printing system 40 does not have to be immediately downstream of the cable fabrication system 40. Indeed, in an anticipated arrangement, for example, following fabrication, the cable 10 can be stored on a spool, such as spool 82. The spool 82 can then at, for example a later time or different location, be used as the feed to the printing system 40.

Figure 17:
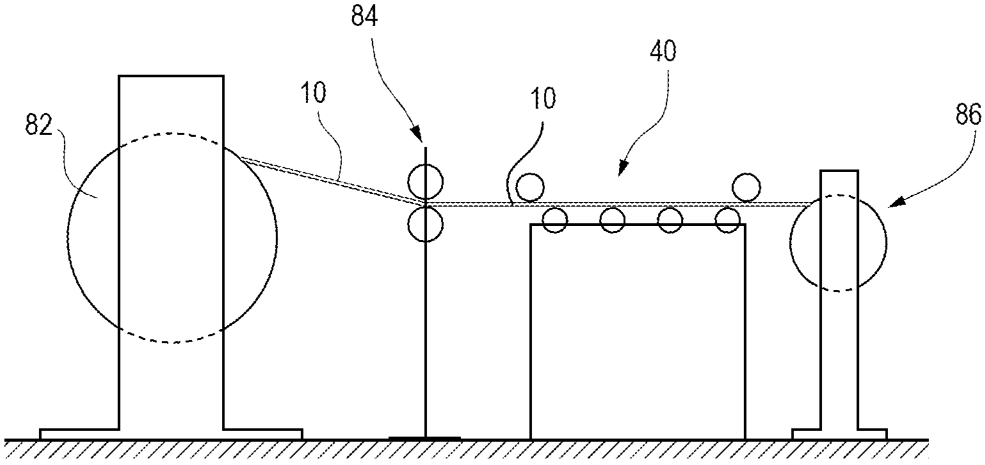
FIG. 17 is a schematic illustration of a storage, feed, print and take-up arrangement for direct printed corrugated metal clad cable.

An example of such a system is shown schematically in FIG. 17. The cable 10 is fed from the spool 82 into the printing system 40 at entrance roller 46. A cable tensioner 84 can be positioned upstream of the printing system 40 to provide sufficient tension to the cable 10 as it is fed into the printing system 40. It is envisioned that the feed or payoff spool 82 will be an idler spool and as such, a cable tensioner 84 between the payoff spool 82 and the printing system 40 would be desirable to maintain proper tension in the cable as 10 it approaches the entrance roller 46 and is fed into the printing system 40. In an anticipated system, a biased dancer, such as a spring actuated pivoting or reciprocating dancer arm, or arms, can be used to provide the desired tension in the cable 10 without over-tensioning the cable 10 as it is fed into the printing system 40. The cable 10 can then be taken up on at take-up spool or reel 86 for subsequent processing.

The ink used for the printing is a UV curable ink that can be pigmented or unpigmented. A suitable ink is a LED UV curable ink can be pigmented or unpigmented, such as that commercially available from Squid Ink Manufacturing of Spring Lake, MN under product numbers SI-PZ8000-500 (black ink), SI-PZ8001-500 (red ink), SI-PZ8003-500 (green ink), SI-PZ8010-500R (white ink) and SI-PZ81620ZDEV-500R (blue/turquoise ink). Other colors of ink can of course be used, as can other types/manufacturers inks.

A method for printing on a metal clad or metal armored corrugated cable 10 includes providing a printing system 40 having one or more entrance rollers 46, a series of lower rollers 64, a series of printheads 52, a UV curing station 70, one or more exit rollers 74, ink tanks 58, and one or more print controllers 60. The cable 10 is driven through the printing system 40 through the entrance roller 46, along the lower rollers 64.

The method includes maintaining the cable 10 in a desired horizontal position and a desired vertical position relative to the printheads 52 and moving the cable 10 past the printheads 52, and printing one or more markings 12 on the cable 10. Subsequent to printing, the cable 10 is moved through the gap 72 and then through the UV curing station 70. Following UV curing, the cable 10 passes through the exit roller 74.

In methods, the indicia 12 includes one or more of a distance or length marking 14, a marking 16 indicating the clad material, a marking 18 indicating the number and color of the conductors and a direction of pull of the cable, and a marking 20 indicating the conductor gauge.

In methods, the marking 16 indicating the clad material and the marking 18 indicating the number and color of the conductors is a color coded marking. In methods, the marking 18 indicating the number and color of the conductors and the marking indicating the direction of pull of the cable are the same marking.

It will be understood that the features from any one of the embodiments described above may be implemented in, combined or used together with, or replace features from any of the other embodiments described above. Additionally, although V-groove rollers are described, other types of rollers will be recognized by those skilled in the art and can be used to maintain the cable properly distanced from and aligned with the printheads.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A method for direct printing on corrugated metal clad cable comprising:

providing a printing system having one or more entrance rollers, a series of lower rollers, a series of printheads, a UV curing station, one or more exit rollers and one or more print controllers;

transporting the cable into the printing system, passing the cable through the entrance rollers and along the lower rollers;

moving the cable past the printheads, and printing one or more markings on the cable;

moving the cable through a space between a last of the series of printheads and the UV curing station;

moving the cable through the UV curing station to cure the one or more markings on the cable; and passing the cable through the exit rollers.

2. The method of claim 1, wherein the rollers of the set of lower rollers include a low friction surface.

3. The method of claim 1, wherein the rollers of the set of lower rollers are V-groove rollers.

4. The method of claim 1, wherein the one or more entrance rollers are V-groove rollers.

5. The method of claim 1, wherein the one or more exit rollers are V-groove rollers.

6. The method of claim 5, wherein the one or more exit rollers are V-groove rollers.

7. The method of claim 1, wherein the markings include one or more of a distance or length marking, a clad material marking, a conductor number and color marking, a direction of pull of the cable marking, and a conductor gauge marking.

8. The method of claim 7, wherein the clad material marking and/or the conductor number and color marking are color coded markings.

9. The method of claim 7, wherein the number and color of the conductors marking and the direction of pull of the cable marking are the same marking.

10. The method of claim 7, wherein the number and color of the conductors marking and the direction of pull of the cable marking are chevrons.

11. The method of claim 1, including biasing the cable toward the lower rollers.

* * * * *